(12) United States Patent
Ritchie

(10) Patent No.: US 6,251,214 B1
(45) Date of Patent: Jun. 26, 2001

(54) DECORATIVE COMPOSITE STRUCTURES

(75) Inventor: Bruce John Ritchie, Balgowlah (AU)

(73) Assignee: Minera Pty Limited, Balgowlah (AU)

( * ) Notice: Subject to any disclaimer, the term of this patent is extended or adjusted under 35 U.S.C. 154(b) by 0 days.

(21) Appl. No.: 09/103,981

(22) Filed: Jun. 24, 1998

(51) Int. Cl.⁷ ...................................................... A61L 15/07
(52) U.S. Cl. ......................... 156/327; 156/60; 156/62.2; 156/230; 156/276; 156/277; 156/327; 428/199; 428/200; 101/34; 101/146; 101/480
(58) Field of Search ................................... 422/172, 282; 428/199, 200, 203, 204; 101/34, 146, 488; 156/230, 60, 62.2, 276, 277, 327

(56) References Cited

FOREIGN PATENT DOCUMENTS

| 556058A | 8/1993 | (EP) . |
|---|---|---|
| 1227634 | 11/1988 | (IT) . |
| 53-057272A | 5/1978 | (JP) . |
| 55-080562A | 6/1980 | (JP) . |
| 55-133926A | 10/1980 | (JP) . |
| 56-024126A | 3/1981 | (JP) . |
| 56-086719A | 7/1981 | (JP) . |
| 59-031117A | 2/1984 | (JP) . |
| 4-247914A | 9/1992 | (JP) . |
| WO 93/04709 | 3/1993 | (WO) . |

*Primary Examiner*—Richard Weisberger
(74) *Attorney, Agent, or Firm*—Akin, Gump, Strauss, Hauer & Feld, L.L.P.

(57) ABSTRACT

The invention provides a fibre reinforced composite, such as a glass-fibre composite in which one or more layers (4) carry an image or design. The image or is preferably printed onto one or more layers (4) of the composite which are then formed into the article required. By utilising the fibre reinforcement to carry the image or design, it is possible to create articles with complex curved surfaces having an image as part of the structure and without using a foreign layer to carry the image.

2 Claims, 2 Drawing Sheets

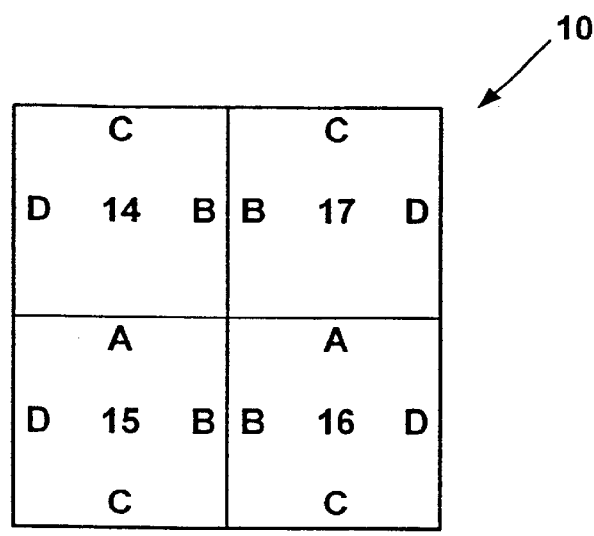
FIG. 3
FIG. 4
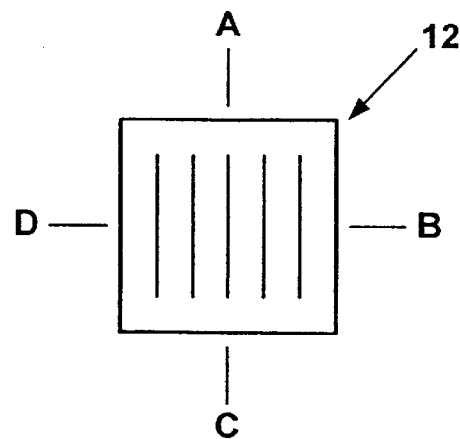
FIG. 5

DECORATIVE COMPOSITE STRUCTURES

FIELD OF THE INVENTION

This invention relates to composites such as fiber reinforced plastics, such as glass or carbon fiber reinforced plastics and more particularly to providing an aesthetically improved surface appearance to such composites. The invention has particular relevance to boats but is not limited to such applications.

BACKGROUND OF THE INVENTION

Fiber reinforced composites provide increased performance over traditional materials, such as wood, in the areas of strength, durability and strength to weight ratio, but generally cannot provide as aesthetically pleasing surface appearances. Fiber reinforced composites typically have a solid colour surface which may be modified by painting etc. However, until now it has not been possible to provide a surface finish which has a detailed appearance.

Wood is a traditional material which provides a much more pleasant visual effect and as such it is desirable to have wood surfaces in a boat. However water craft are subject to relatively extreme weathering conditions from the combined action of sun, temperature, water and air etc. Whilst timber may be protected against weathering by use of suitable surface coatings, such coatings usually require periodic re-application or other maintenance to maintain the finish.

In the surfboard industry it is known to place small decals under the initial gel coat of fiber glass surfboards. These decals are a paper tissue onto which a design has been printed. When incorporated in a surfboard, the paper becomes transparent and leaves the design alone against whatever background colour has been selected.

Whilst use of small decals for a surfboard is practicable, it is not possible to "scale up" the technique for use on larger structures, such as a boat. The use of tissue paper in a fiber glass structure causes a discontinuity in the structure. Accordingly when subject to high loadings, the likelihood of the structure delaminating at the junction of the fiber glass and the paper is increased. The use of, for instance, a sheet of paper extending over a major portion of a composite would be unacceptable.

Tissue paper is generally inflexible and cannot be stretched. This is not a problem with surfboards where decals are placed on a generally planar surface. However where the surface is curved in more than one dimension, use of tissue paper is not practicable since this would require cutting of the paper to take out excess material and insertion of separate pieces in spaces. Obviously if a non-random design were utilised, this would result in an unacceptably distorted design, apart from the extra labour involved.

In an attempt to overcome the above problem the present invention, in one broadly form, provides a composite which includes at least one carrier layer of reinforcement bearing the design. Thus, in a glass fiber composite, the composite includes one or more layers of glass fiber upon which the design is carried.

Preferably the design is printed onto the filament or filaments of a single fiber layer. More preferably the layer is a non-woven layer. Use of a mono-filament non-woven fiber glass layer as the carrier for the design provides best results, but is not essential. Use of a woven mat will provide acceptable results especially with a simple design, such as a large logo. However use of woven matting near the surface of a composite generally causes "print-through", in which the gel coat, over time, adopts the surface profile of the underlying matting. Where an intricate design is used, this would generally not be acceptable. Use of woven matting also restricts the fine resolution one tries to effect in reproduction.

If desired an additional layer of reinforcement may be placed in front on the image carrying layer or layers. If this is done, a non-woven layer is best. Preferably no gel coat or additional reinforcement is placed in front of the design. Instead after the composite has cured multiple coats of a clear resin or varnish, such as a polyurethane resin, gives a deep rich lustre to the finished product. Use of such a resin or varnish also provides an excellent protective finish.

The design applied to the carrier may be of any form, such as company logo, photographic images or a graphical work.

When a photographic image is utilised, preferably it is manipulated electronically prior to application to the carrier. Whilst it is possible to transfer a photographic image to the carrier layer without manipulation, this generally results in dark areas being excessively dark and so lacking detail. Electronic manipulation to reduce the dynamic range of the lightest to the darkest areas produces more acceptable results.

If the image is repetitive, it is preferable to electronically "flip" the image end on end before application to the carrier layer. Such a manipulated image has no obvious joins within the single image. Further separate pieces of the carrier layer may be butted up to each other with mirror images on either side of the join. This enables a more "continuous" appearance to be obtained in which the joins are not readily visible.

SUMMARY OF INVENTION

In one broad form the invention also provides a method of manufacturing a fiber reinforced composite, the method comprising:

a) providing a first fiber layer carrying a image or design on one side; and b) impregnating the first layer with a suitable resin or matrix; and c) curing the resin or matrix.

Optionally, the resin or matrix is transparent and colourless when cured, but translucent or coloured resin may be utilised. Step (b) may occur before or after step (a). Preferably the first layer has been wetted out prior to laying it into the mould. Prior to step (b) the first layer may be laid into a mould which has been coated with a gel coat. Preferably, no gel coat is used and the first layer is laid directly into a mould coated with a release agent.

Preferably after steps (b) and (c) one or more second fiber layers are laid onto the rear surface of the impregnated and cured first layer and impregnated and cured with a suitable second resin or matrix.

Preferably the second fiber is of the same type of the first fiber.

Preferably the second resin is opaque when cured and more preferably is coloured.

Preferably, after curing, the front surface of the composite is coated with a suitable resin or matrix.

BRIEF DESCRIPTION OF DRAWINGS

The invention will be better understood from the following description of a non-limiting embodiment and the drawings in which:

FIG. 3 shows a schematic layout of an image to be placed on a carrier layer.

FIG. 4 shows how the composite images may be placed end on end and side by side.

FIG. 5 shows an original image used to create the final image.

DETAILED DESCRIPTION OF THE PREFERRED EMBODIMENTS

Figure 1:
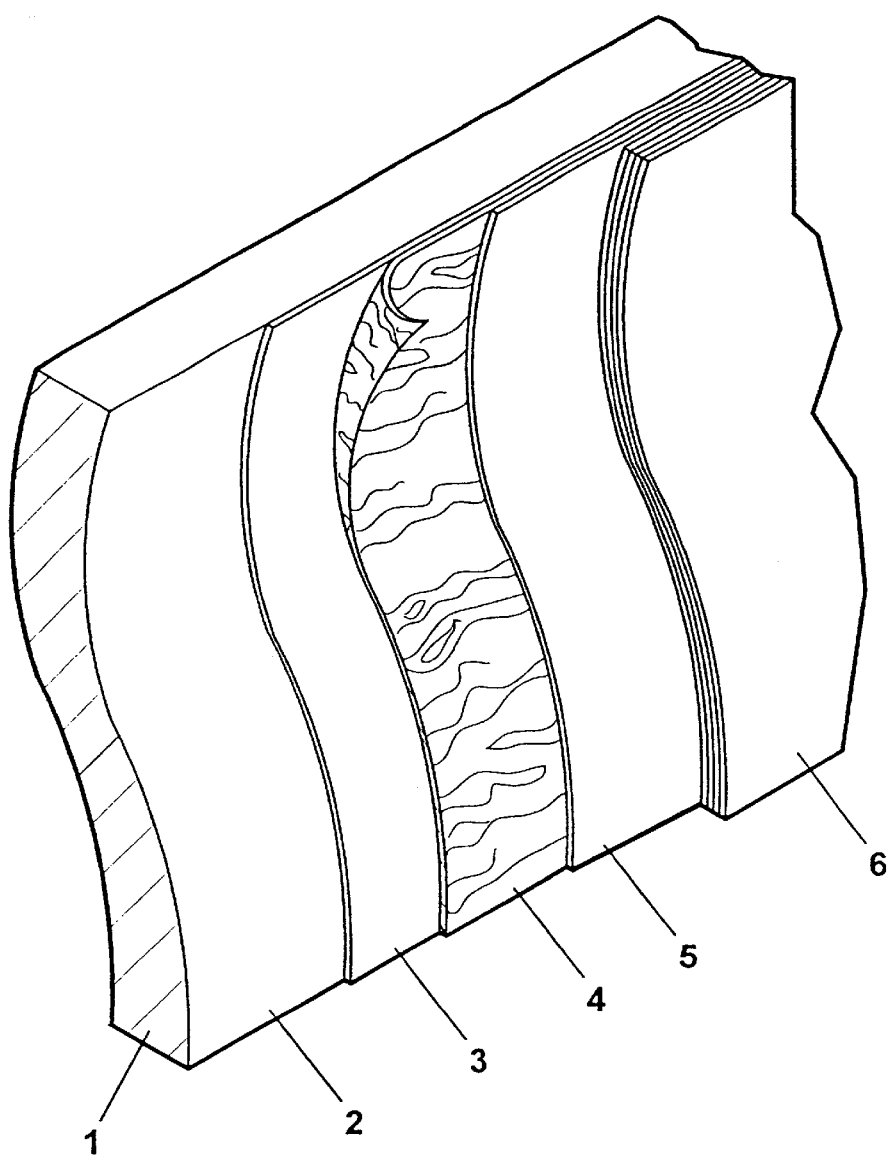
FIG. 1 shows a perspective view of a composite construction in a mould according to the invention.
Figure 2:
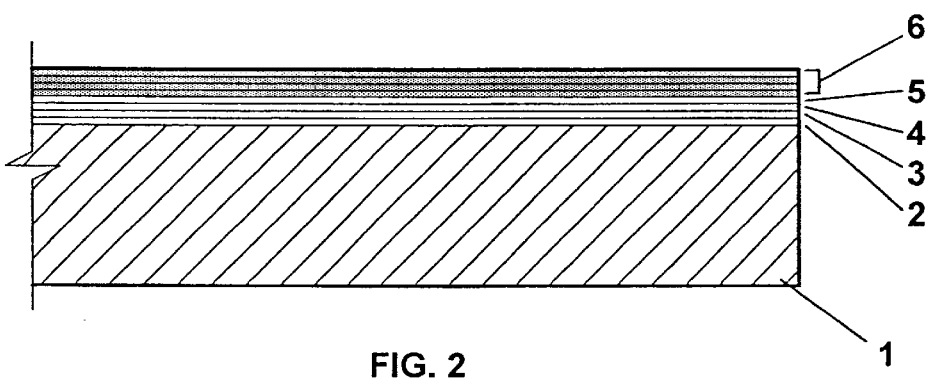
FIG. 2 shows a cross section through a portion of the composite construction of FIG. 1.

Referring to FIG. 1, there is shown schematically the layers involved in constructing the composite according to one embodiment of the invention.

FIG. 1 shows a female mould 1, the mould having been coated with a release agent 2. An optional gel coat 3 is also shown, but in most cases it is not used. A fiber glass layer 4 bearing an image is laid into the mould in a conventional manner. Preferably the layer 4 has been wetted out with a suitable resin, prior to laying into the mould. Preparation of this image bearing layer 4 will be described later. The layer 4 preferably comprises a series of separate panels or strips of fiber glass tissue and it is necessary to carefully align the various panels or strips so that the image at their edges is aligned. Thus the join between the panels or strips will not be readily apparent.

The image bearing layer 4 is laid with the image side of the layer 4 facing the mould 1 and is then "wetted out" with a further layer of clear resin. The second resin is then allowed to harden.

It is preferable to provide a background colour against which the image is viewed. When the image is a wood grain, it is relatively easy to alter the apparent type of wood merely by changing the background colour, the wood grain image or both.

The background colour is provided by next laying a suitable pre-coloured resin onto the back surface of the hardened fiber reinforced composite. A suitable fiber glass matt or cloth is then laid into the still wet coloured resin and allowed to harden. This then forms the background colour layer 5.

To complete the initial production of the composite, further layers 6 of the fiber glass mat or cloth may be laid onto the rear of the background layer 5 together with suitable resin to provide the necessary structural requirements. If the structure has the required characteristics with just the fiber glass layers 4 and 5, then the additional layer or layers 6 may be omitted.

When no gel coat is used, it is preferable to coat the outer layer of the composite with a protective resin or varnish, such as a polyurethane varnish, preferably by spraying. Use of a polyurethane varnish provides a rich, deep lustre and also provides a more durable and less porous surface compared to conventional gel coats.

If desired an additional layer of reinforcement may be placed in front on the image carrying layer. If this is done, a non-woven layer is best, since it becomes less visible than a woven material when impregnated with resin. However, any fiber layer in front of the image will tend to degrade the image and so is not preferred. For the same reason, the use of a non-woven layer to carry the image is better, since it allows the background colour to show through more strongly than does a woven layer. Obviously such a layer would need to be laid into the mould prior to laying the image carrying layer.

Whilst use of a single layer to carry the image or design is preferred, if desired more than one layer may be used for parts of the image. This may be to enable different colours to be placed on different layers or to enhance the "3 D" effect. If multiple layers are used for the image they may be laid together wet or laid and hardened one at a time.

The preferred image placed on the image layer 4 is an image of wood which has a pleasant appearance, which presents special problems compared to, for example, a simple black and white logo, due to the fine texture of the "wood grain".

An image of a suitable wood grain may be obtained by photographing either a real piece of wood or, for example, a synthetic wood veneer panel.

It has been found that transferring the image without modification to the fiber carrier layer does not result in satisfactory results. With the normal dynamic range of intensity of a photographic image, dark areas tend to merge and lose detail. However if the overall intensity is evenly reduced, the light areas lose detail when the dark areas are acceptable.

Furthermore, construction of a boat according to the invention is more easily accomplished if large strips of fiber glass tissue are utilised. To enable the tissue to be laid end on end and side by side and still provide an acceptable visual appearance, it is necessary that opposite sides and ends of each strip have an identical pattern. This requires the image to be flipped end on end, as seen in FIG. 3.

Referring to FIGS. 3 & 5 a composite image 10 is created by reproducing a number of versions of the original image 12. In FIG. 3 the composite image comprises four panels, 14–17, each a version of the original 12, which are arranged in a square. Each image has side A, B, C and D and it will be seen that each panel is a mirror image of its adjacent panel about the relative join line. Thus panels 14 and 15 have sides A adjacent at join line 18 whilst panels 15 and 16 have sides B adjacent at join line 15. The effect is that opposite sides of the composite 10 have the same sides, albeit mirror images. Thus it is possible to lay multiple copies of the composite end on end either horizontally or vertically with each composite being a mirror image of each adjacent composite, so hiding joins, as best seen in FIG. 4.

It is possible to do this by turning a photographic negative. However the image produced when the negative emulsion faces downwards is slightly different to that reproduced when the emulsion faces upwards.

Thus it is best, but not essential, to convert (digitise) the image to an electronic form and then electronically manipulate the image. Once in electronic form, the image may be manipulated to control the dynamic range of intensity from the brightest to the darkest portion of the image.

It is also relatively easy for one to produce the composite image, as in FIG. 3 which comprises a number of individual images which are mirror images of each other.

Once the image has been electronically manipulated a line positive is produced onto clear film base having a multiple image as in FIG. 3. Such a film positive is typically 1.5 m wide by 1.5 m high. A silk screen printing stencil is produced from the film positive for production of printed fiber glass strips. As mentioned, it is possible to put multiple copies of the composite image on a strip, as in FIG. 4, and still hide any joins.

When dealing with an image such as one of wood, it is necessary to further manipulate the image so as to produce acceptable results. An image of wood grain tends to have many, generally parallel but very thin lines. If one attempts to produce a half tone image, the result is the lines become broken and look very grainy.

Accordingly, when digitising the image, it is digitised using a line screen. A screen having 160 lines to the inch gives good results.

After the image has been electronically manipulated it is then output to an ordinary film positive. However, it has been found that utilising this line positive directly to prepare a silk screen does not produce acceptable results. However, better results are achieved if an ordinary film negative is taken of the positive image and an ordinary contact positive made. The result is an image that is not a half tone nor, strictly speaking, a true line image.

When such an image is transferred to a silk screen, which typically has a weave of 65 lines per inch, one obtains a surprisingly acceptable result.

The fiber glass tissue used to carry the image is preferably a non-woven mono-filament tissue. The tissue is preferably a heavier than normal weight (500 g/m2 as opposed to 350 g/m2) and is also provided with an extra amount of binder, (8–9 g/M2 as opposed to 7 g/m2 normally).

The tissue with binder material is normally smoother on one side than the other side. Best results are achieved if the image is printed on the smooth surface, although this is not essential.

The fiber glass is too fibrous to be automatically printed and so must be manually printed using a "one arm bandit" type of silk screen printer. The inks utilised for the printing are conventional setting inks which are fast when subject to conventional fiber glass resins. Obviously when utilising different fibers and resins, the inks utilised must be compatible and "fast" with the fibers and resins used.

The use of a fiber glass tissue as the carrier for the image produces a number of advantages.

When finished, the image is, in effect, sandwiched between the polyurethane varnish (or the clear gel coat) at its front and the coloured background to its rear. The coloured background is a small distance behind the image, due to the presence of the carrier layer 4. Accordingly a 3-D effect is produced between the image and the front and rear. This is further enhanced by the ink itself having depth, as a result of coating the fiber glass fibers.

Use of fiber glass tissue also allows the image to be moulded in any complex 3-D mould shape without substantial distortion. More particularly the fiber layer may be stretched or compressed as appropriate as the mould shape varies so that joins between sheets the images of both sheets remain matched together. This is not possible when utilising a paper based carrier for the image.

The use of a fiber as the carrier for the image which is the same as the other fibers of the structure also does not compromise the structural integrity of the structure. This eliminates any increased risk of delamination or other failure which may occur with other non-compatible substrates.

I claim:

1. A method of forming a fiber reinforced composite which includes an image, comprising the steps of:
   a) providing at least one layer of fiber reinforcement;
   b) applying an image or part of an image to a front surface of the or each layer of fiber reinforcement;
   c) embedding the at least one layer of fiber reinforcement in an uncured matrix, and;
   d) curing the matrix; wherein step b) comprises;
      i) obtaining an image of an object;
      ii) digitising the image to produce a digital image;
      iii) reducing the dynamic range of the intensity of, the digital image; and
      iv) applying the digital image to the at least one layer of fiber reinforcement.

2. The method of claim 1 wherein step ii) utilises a line screen.

* * * * *